INVENTOR
BRIAN W. VOTH

Merriam, Marshall, Shapiro & Klose
ATTYS.

Oct. 27, 1970 B. W. VOTH 3,537,083

FLEXIBLE SURFACE DISC FOR MAGNETIC RECORDERS
WITH CENTRAL PNEUMATIC ORIFICE

Filed Nov. 27, 1968 2 Sheets-Sheet 1

INVENTOR
BRIAN W. VOTH

Merriam, Marshall, Shapiro & Klose
ATTYS.

United States Patent Office 3,537,083
Patented Oct. 27, 1970

3,537,083
FLEXIBLE SURFACE DISC FOR MAGNETIC RECORDERS WITH CENTRAL PNEUMATIC ORIFICE

Brian W. Voth, Urbana, Ill., assignor to University of Illinois Foundation, Urbana, Ill., a corporation of Illinois Filed Nov. 27, 1968, Ser. No. 786,802
Int. Cl. G11b *5/60, 5/82, 15/43*
U.S. Cl. 340—174.1 4 Claims

ABSTRACT OF THE DISCLOSURE

An improved rotating disc base assembly for magnetic recording devices having a disc base with a relieved surface section defining a cavity on one or both sides of the base, a flexible magnetic recording film attached to the base surface and extending across the cavity, and controlled air pressure means coupled to the cavity for controllably stiffening or relaxing the flexible film.

FIELD OF THE INVENTION

This invention relates to information storage devices of the magnetic record and playback type, and in particular to rotating disc apparatus incorporating a flexible, air-supported magnetic film.

DESCRIPTION OF THE PRIOR ART

Various magnetic recording and playback systems currently available utilize a thin, magnetic film in the form of a circular disc with a levitating magnetic read-record head moving linearly across the rotating disc in order to enter and remove information from the disc. In some cases the magnetic medium is sprayed or deposited as a coating which adheres to the drive base. In either instance, the surface of the magnetic recording medium must be kept within prescribed limits in order to prevent the levitating head from bouncing on the surface. Levitating head bouncing causes the skipping of data or what is normally termed "data dropout." Some systems have used a padded drive base with the levitating heads; however, this has only lessened, but not completely eliminated the problem.

In the transfer of high-speed data, flexible discs of magnetic recording mediums have been used. In such systems the discs are rotated at very high speeds, normally between 1000/8000 r.p.m., so as to create a lift of the flexible magnetic disc towards a stationary head. Due to the required very high rotational speeds of the magnetic recording medium, such systems are generally utilized for high-speed data processing and are not very applicable for audio frequency systems.

SUMMARY OF THE INVENTION

In accordance with the principles of the present invention, there is provided in a magnetic record and playback device having stationary magnetic heads, an improved rotating disc base having a flexible, air-supported magnetic recording membrane, and wherein changes in pressure enable the flexible recording medium to controllably contact the transducer surface or to be freed from the surface. In the preferred embodiment of the invention, a controlled source of air pressure is introduced into the disc base for acting on the flexible recording medium. The advantages of the present invention, as compared to conventional configurations of a solid disc and levitated heads or stationary heads and flexible rotating discs are: (1) the design and production simplifications possble in the fabrication of discs and surfaces from readily available materials which are not precisely flat; (2) the design and production simplifications possible through mounting transducer heads in a fixed manner rather than a levitating manner which requires movement because of surface irregularities of the associated disc; (3) the shorter access times possible through denser arrangements of transducer heads in fixed, compact mountings; and (4) the significant reduction in rotational speed as compared to present flexible disc apparatus.

DESCRIPTION OF THE PREFERRED EMBODIMENTS

Figures 1, 2:
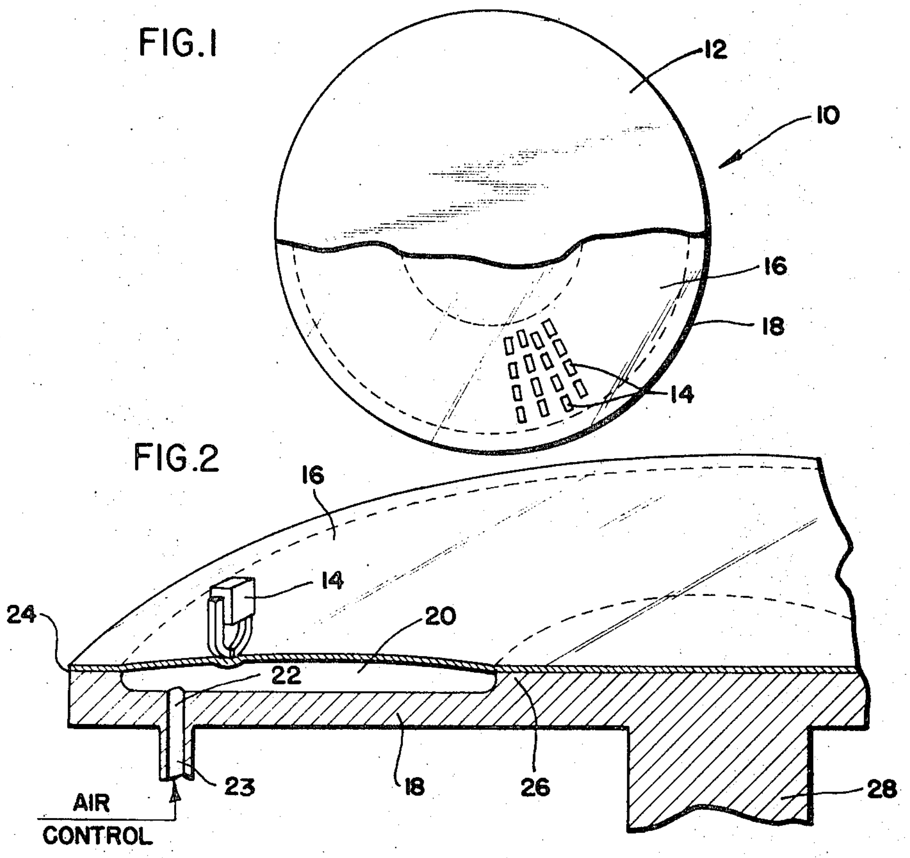
FIG. 1 is an illustration of a multi-head, contact-type magnetic record and playback device constructed in accordance with the principles of the present invention.
FIG. 2 is a sectional view illustrating one embodiment of the invention wherein a novel disc base assembly includes a cavity over which is attached the flexible recording medium for selectively contacting the magnetic head according to the invention.

Referring to FIG. 1, there is illustrated a multi-head contact-type magnetic audio recording device constructed in accordance with the principles of the present invention. It is to be understood that this illustration is only an example of the preferred use of the principles of the invention, whereas the invention can, as well, be applied to recording devices using only a single magnetic head, or those operating at higher frequencies than the audio frequency band. Many of the primary advantages of this invention are especially obtained when the principles are utilized in the illustrated multi-head recording device in the audio range.

In FIG. 1 there is illustrated a magnetic recorder 10, including a cover number 12 provided for supporting a plurality of magnetic heads indicated schematically by the reference numeral 14. It is to be understood that the magnetic heads 14 are supported and preferably aligned radially within the cover assembly 12 substantially throughout the area of an improved disc base assembly 15. The disc base assembly 15 includes a flexible magnetic recording medium 16 mounted to a disc base 18.

FIG. 2 illustrates the disc base 18 having an upper surface with a relieved surface section defining an annular cavity 20 and a passageway 22 through the body of the disc and ending in an inlet port 23 for receiving changes in air pressure. The flexible magnetic recording film 16 is attached to the upper surface of the disc base so as to overlap the cavity 20, the film 16 being attached by standard cement means to the disc base outer edge 24 and to the inner portion 26. The disc base 18 can be formed of aluminum or magnesium or of any similar material having a coefficient of expansion similar to that of the flexible film 16. The flexible recording film 16 can be conveniently formed of 1–1.5 mil Mylar or any similar suitable material. The film 16 is attached to the upper surface of the disc base in a slightly taut manner, which produces an initial flatness to the film surface when free of the magnetic heads 14 or of any upward force within the cavity 20 due to an increase in air pressure through the air pressure inlet 23. Shaft 28 is rotated by conventional means at about 3–4 r.p.m. for operating the recording device 10 at audio frequencies.

Figure 3:
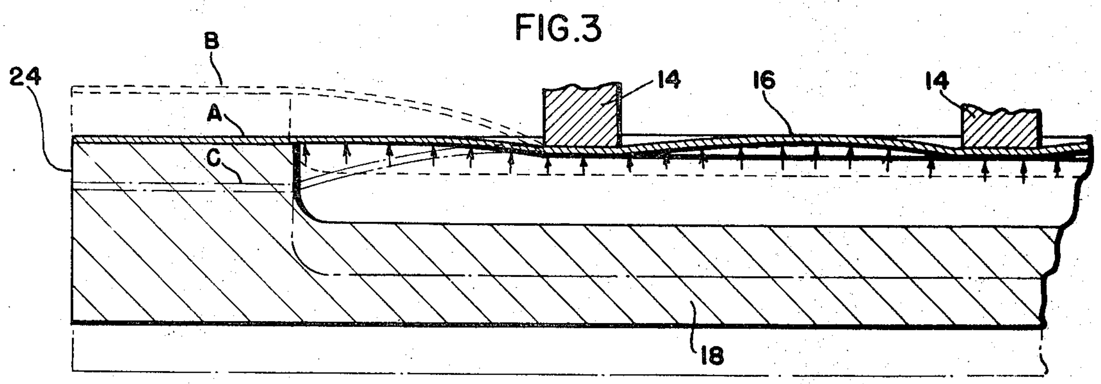
FIG. 3 is an expanded sectional view in schematic form showing in dashed lines the positions of the flexible film in the case of surface irregularities.

FIG. 3 is an enlarged radial cross section of the typical embodiment of the invention in which the magnetic film 16 is only attached to the upper surface of the disc base 18. FIG. 3 illustrates the manner in which the flexible magnetic film 16 is provided in order to contact the magnetic head surface. For the purpose of illustration, the curvature of the surface is exaggerated with respect to what it would be in practice. For convenience, only two of many possible magnetic heads 14 are illustrated in FIG. 3, each of the heads being in a fixed position with respect to the axis of rotation of the disc base, and are near each other and the outer edge 24 of the disc base. The upper surface and outer edge of the flexible film 16 is shown in three positions, indicated in FIG. 3 as A, B, C, each representing positions of movement the flexible film surface may assume during operation. Position A might be an average position of the upper film surface and would be that position which the transducers or magnetic heads 14 would be aligned to. Positions B and C are the limit positions of the upper surface of the flexible film 16, which would normally occur in practice if the disc base 18 is not running perfectly true in rotation.

If this were the case and the magnetic heads of 14 were not levitating, but maintained in a stable, vertical position within the head cover 12, it can be seen that for positions B and C many of the heads would be extremely distant from the recording medium leading to data dropout. However, according to the present invention, it is to be noted that because of the supporting forces, indicated by the small arrows in FIG. 3, and provided by the air under pressure supplied through the air inlet port 23, the flexible film surface 16 is pressed against the magnetic head faces as shown in FIG. 3. Even when the upper surface of the film 16 is at the extreme limits indicated by positions B or C, the film flexes under the supplied air pressure so that it remains in contact with the transducer or magnetic head surfaces. It is to be understood that the air supporting force required for the maintenance of contact of the recording film 16 with the magnetic heads will increase with increasing limits of positions B and C, increase with increasing stiffness or initial tension of the film 16, increase with a decrease of distance between the magnetic heads 14 or between the heads and the outer edge 24 of the disc, and increase with a decrease in flatness of the flexible film. In any case, the limits of positions B and C are not large, the film virtually flat, and the magnetic heads spaced not too close to one another or to the edge of the disc, the air pressure required to keep the flexible film 16 in acceptable contact with the magnetic head faces so as to minimize data dropout will be relatively small, as will also be the effects of any wear on the film or on the magnetic head surfaces. A head pressure of approximately 0.15–3.0 grams on the flexible recording surface 16 is sufficient to insure acceptable contact. Typical materials favor the higher pressures at the present time. Also, the controlling of the flexible film 16 to insure acceptable contact of the film with the face of the magnetic heads is generally in the order of a small fraction of an atmosphere. To remove the film from engaging the magnetic head faces, the air pressure can be lowered, or a slight negative pressure or a vacuum can be supplied to the annular cavity 20 through the inlet port 23.

Figure 4:
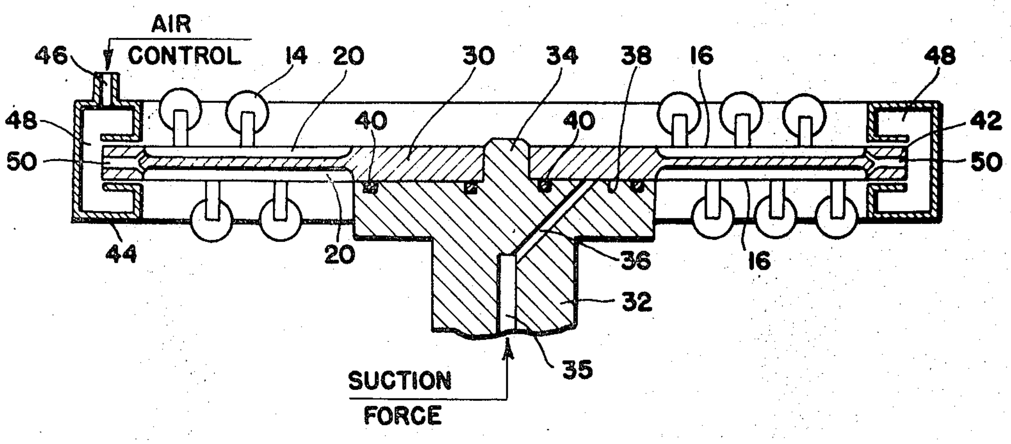
FIG. 4 is a sectional view illustrating one configuration for entering the pressure means for controlling the flexible film.
Figure 5:
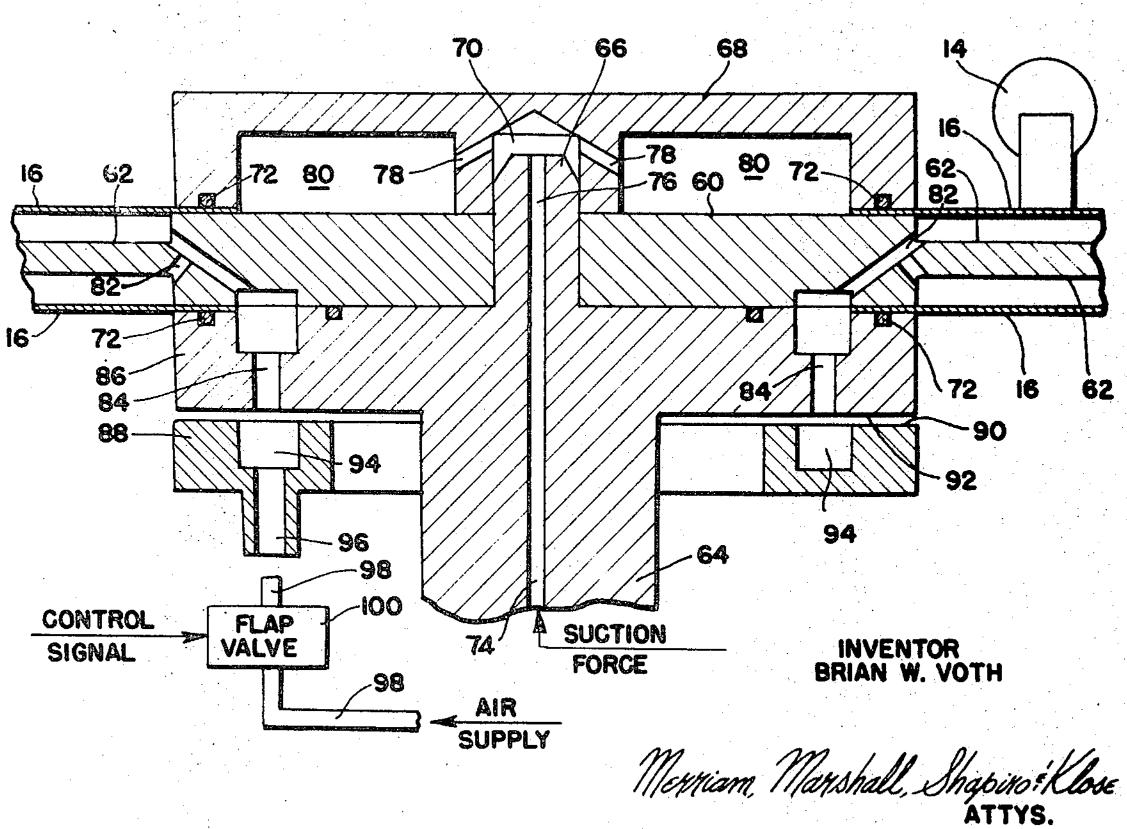
FIG. 5 is a sectional view of still another alternative embodiment of the present invention illustrating a multi-head configuration wherein the central drive hub incorporates a passageway for maintaining the disc base secured to the hub; and further illustrates a controlled change in air pressure being introduced to a fixed non-rotating circular ring having a duct which communicates with the rotating disc base carrying the flexible magnetic recording film.

FIGS. 4 and 5 illustrate alternative embodiments of the invention wherein a pair of recording films 16 are applied to both the top and bottom portions of the disc base. In FIG. 4, the disc base 30 includes an annular cavity 20 both at the top and bottom portions of the disc base. A pair of recording films 16 are suitably mounted to the disc base 30 in a manner as illustrated previously in connection with base 18 of FIG. 2. A series of magnetic heads 14 is mounted in a suitable head cover both above and below the disc base 30. For convenience of illustration, the head cover has not been shown in FIG. 4, and the plurality of magnetic heads are only schematically illustrated in this figure. The disc base 30 and the associated flexible films 16 are maintained on a drive hub 32 by means of a central aperture in the disc base which engages a protruding pin 34 extending from the top surface of the drive hub 32, and includes a vacuum port 35 communicating with a passageway 36 through the drive hub for applying a vacuum or suction force, which through the passageway 36 acts on the bottom surface 38 of the disc base 30 and thereby maintaining the disc base in position. Suitable O-ring means 40 on each side of the protruding pin 34 maintain the desired suction force, drawing the disc base towards the top surface of the drive hub. At the periphery of the flexible film 16 and immediately adjacent the outer edge 42 of the disc base 30, there is provided a circular enclosure of shroud 44 for supplying the controlling air pressure to the flexible film. The shroud 44 is stationary in position with respect to the rotating disc base 30, and can be conveniently mounted to the frame of the recording mechanism. The shroud includes an inlet port 46 for directing air pressure into an annular recess 48 completely around the disc base 30. A series of openings or a complete annular opening 50 at the extreme outer edge 42 of the disc base 30 transfers the air pressure to the annular cavity 20, both above and below the disc base.

The operation of the alternative embodiment shown in FIG. 4 is similar to that previously described in connection with FIGS. 2 and 3 in that the suitable air pressure supplied through inlet port 46 and coupled into the annular recesses 20 in the disc base, act upon the respective flexible recording films 16 to insure a continuous contact between the film surface and the magnetic head faces during rotational movement of the disc base 30 by the drive head 32. The disc base 30 and associated recording surfaces can be removed and replaced by disengaging the shroud 44, removing the vacuum supply to vacuum port 35, and lifting the disc base 30 off of the protruding pin 34. Instead of using the vacuum supply at inlet port 35, the disc base 30 can be maintained in contact with drive hub 32 by means of a hold-down screw threaded into the protruding pin 34 and having a hold-down surface engaging the top portion of disc base 30.

Referring now to FIG. 5, there is illustrated a preferred embodiment of the principles of the present invention in which the controlling pressure or vacuum for insuring contact between the flexible film 16 and the magnetic heads is introduced through suitable ducts and passageways in the drivehead—as opposed to the embodiment of FIG. 4, wherein the ducts have been provided in the shroud or circular enclosure 44 at the outer rim of the disc base 30.

In FIG. 5, a disc base 60 includes an annular recess of 62 similar to that shown in FIG. 4 in the dual recording surface embodiment shown therein. The disc base 60 is mounted on the top surface of a drive hub 64 with a central aperture in the disc 60 engaging a protruding alignment pin 66. A cap member 68 includes a central aperture 70 for engaging the small portion of the alignment pin 66 protruding above the surface of the disc base 60. Suitable O-ring means 72 are used between the cap 68 and the top surface of the disc base 60 and in between the disc base 60 and the top surface of drive hub 64. The disc base 60 is contained in position on the drive hub by means of a vacuum source applied to an inlet port 74 connecting to a passageway 76 located centrally and longitudinally along the drive hub and alignment pin thereby connecting with the central aperture 70 and with connecting passageways 78 communicating with an annular cavity bounded by the inside portion of cap 68 and the top surface of disc base 60.

From the illustration of FIG. 5, it can be seen that as the vacuum source is applied to inlet port 74, the cap 68 will urge the disc base 60 downwardly against the top surface of the drive hub 64 so that the cap member, the disc base and the drive hub rotate as a single unitary member.

The preferred embodiment for coupling of the controlling air pressure or vacuum for selectively engaging the flexible magnetic recording film 16 to the faces of the magnetic heads 14, is shown in detail in FIG. 5. Each of the annular cavities 62 in the disc base 60 are connected by suitable passageways 82 to an annular recess 84 provided in the upper portion 86 of drive hub 64. A circular plate 88 is mounted to the recorder frame so it can be stationary in position with respect to the rotating portion 86 and immediately adjacent thereto. A very small clearance is provided between the top surface 90 of the stationary plate 88 and the bottom surface 92 of the immediately adjacent rotating portion 86 of the drive hub. Either or both of the surfaces 90 and 92 can be formed of nylon bearing surfaces or other similar surfaces of high lubricity can be provided.

The stationary circular plate 88 includes an annular cavity 94 and a connecting inlet port 96. A source of air pressure is coupled through suitable conduits 98 with an intermediate flap valve 100 to the inlet port 96 for coupling the controlled air pressure through passageways 94, 84, 82 and into the respective annular recesses 62 for controlling positioning of the flexible film 16. The flap valve 100 is a commonly known means for controlling the air pressure between the two levels in response to a control signal actuating suitable solenoid means. In practice, the control signal actuates the flap valve 100 to select one level of air pressure from the air pressure source and transferring this air pressure to the annular recess 62 for urging the flexible film 16 against the magnetic head faces 14 during the transfer of data to and from the recording medium 16. When the transfer of data from the recording medium 16 is not required or desired, a suitable control signal to the flap valve 100 changes the supplied air pressure from the source to the cavity 62 so as to suitably disengage the flexible film 16 from the magnetic head.

If desired, a hold-down screw can be threaded into the cap 68 and into the alignment pin 66 for maintaining the disc base 60 on the drive hub 64. The vacuum supply for maintaining the disc on the drive hub in this situation would not be needed, and for replacing the disc 60, the hold-down screw is detached from the alignment pin 66 for removing the cap assembly 68 and thereafter removing or replacing the disc base 60 and the associated recording medium 16.

The foregoing detailed description has been given for clearness of understanding only, and no unnecessary limitations should be understood therefrom, as modifications will be obvious to those skilled in the art.

What is claimed is:

1. An improved rotating disc base assembly for magnetic recorders transferring information through magnetic read-record heads, said improved disc base assembly comprising:

a disc base;

a pair of spatially separated substantially flat, annular disc surfaces on at least one side of said disc base, one of said surfaces extending around the outer perimeter of said disc base and the other of said surfaces extending around the inner perimeter of said disc base;

an annular cavity within said disc base bounded by and extending between said annular disc surfaces;

a flexible magnetic recording film extending from one of said annular disc surfaces, across said cavity, and onto the other of said annular disc surfaces;

mounting means for fixedly mounting said recording film to each of said annular disc surfaces to sealably enclose said cavity within said disc base;

inlet port means in said disc base including an inlet port and a passageway interconnecting the interior of said cavity with said inlet port for coupling to a source of controlled air means for controlling the stiffness and relaxation of said flexible recording film in selectively contacting said magnetic heads during information transfer; and including suction force means associated with one side of said disc base for maintaining said disc base in position during rotation thereof.

2. In a magnetic recorder having a flexible magnetic recording film, a rotating disc base for supporting said film, and magnetic read-record heads mounted adjacent said film for transferring information to and from said film, an improved rotating disc base assembly, the improvement comprising:

a pair of spacially separated substantially flat, annular disc surfaces on at least one side of said disc base, one of said surfaces extending around the outer perimeter of said disc base and the other of said surfaces extending around the inner perimeter of said disc base;

an annular cavity within said disc base bounded by and extending between said annular disc surfaces;

passageway means including an inlet port, said passageway means extending from and communicating with the interior of said cavity through said disc base, and ending in said inlet port;

said flexible magnetic recording film extending from one of said annular disc surfaces, across said cavity, and onto the other of said annular disc surfaces;

mounting means for fixedly mounting said recording film to each of said annular disc surfaces to sealably enclose said cavity within said disc base;

controlled air means coupled to said inlet port for controlling the stiffness and relaxation of said flexible recording film in selectively contacting said magnetic heads during transfer of said information; and including suction force means associated with one side of said disc base for maintaining said disc base in position during rotation thereof.

3. An improved rotating disc base assembly for magnetic recorders transferring information through magnetic read record heads, said improved disc base assembly comprising:

a disc base;

a pair of spacially separated substantially flat, annular disc surfaces on at least one side of said disc base, one of said surfaces extending around the outer perimeter of said disc base and the other of said surfaces extending around the inner perimeter of said disc base;

an annular cavity within said disc base bounded by and extending between said annular disc surfaces;

a flexible magnetic recording film extending from one of said annular disc surfaces, across said cavity, and onto the other of said annular disc surfaces;

mounting means for fixedly mounting said recording film to each of said annular disc surfaces to sealably enclose said cavity within said disc base;

inlet port means in said disc base including an inlet port and a passageway interconnecting the interior of said cavity with said inlet port for coupling to a source of controlled air means for controlling the stiffness and relaxation of said flexible recording film in selectively contacting said magnetic heads during information transfer; and including a rotatingly driven hub for supporting said disc base, and including means for supplying a suction force through said hub and operating upon said disc base for maintaining said disc base in position during rotation.

4. In a magnetic recorder having a flexible magnetic recording film, a rotating disc base for supporting said film, and magnetic read-record heads mounted adjacent said film for transferring information to and from said film and improved rotating disc base assembly, the improvement comprising:

a pair of spacially separated substantially flat, annular disc surfaces on at least one side of said disc base, one of said surfaces extending around the outer perimeter of said disc base and the other of said surfaces extending around the inner perimeter of said disc base;

an annular cavity within said disc base bounded by and extending between said annular disc surfaces;

passageway means including an inlet port, said passageway means extending from and communicating with the interior of said cavity through said disc base, and ending in said inlet port;

said flexible magnetic recording film extending from one of said annular disc surfaces, across said cavity, and onto the other of said annular disc surfaces;

mounting means for fixedly mounting said recording film to each of said annular disc surfaces to sealably enclose said cavity within said disc base;

controlled air means coupled to said inlet port for controlling the stiffness and relaxation of said flexible recording film in selectively contacting said magnetic heads during transfer of said information; and including a rotatingly driven hub for supporting said disc base, and including means for supplying a suction force through said hub and operating upon said disc base for maintaining said disc base in position during rotation.

References Cited

UNITED STATES PATENTS

| | | | |
|---|---|---|---|
| 3,108,259 | 10/1963 | Perkins et al. | 340—174.1 |
| 3,153,241 | 10/1964 | Ramrath et al. | 179—100.2 |
| 3,178,719 | 4/1965 | Shapiro | 340—174.1 |
| 3,179,945 | 4/1965 | Shapiro | 340—174.1 |
| 3,191,179 | 6/1965 | Pelech et al. | 340—174.1 |
| 3,225,338 | 12/1965 | Kelner et al. | 340—174.1 |
| 3,226,701 | 12/1965 | Masson | 340—174.1 |
| 3,303,485 | 2/1967 | Lee | 340—174.1 |
| 3,336,583 | 8/1967 | Comstock | 179—100.2 |

BERNARD KONICK, Primary Examiner

V. P. CANNEY, Assistant Examiner

U.S. Cl. X.R.

179—100.2